US008022844B2

(12) United States Patent
Knoska et al.

(10) Patent No.: US 8,022,844 B2
(45) Date of Patent: *Sep. 20, 2011

(54) MARINE VESSEL MONITORING SYSTEM

(75) Inventors: James J. Knoska, Jensen Beach, FL (US); Melvin L. Dalrymple, Poway, CA (US); William D. Williams, Escondido, CA (US)

(73) Assignee: Yacht Watchman International, Inc., Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/642,065

(22) Filed: Dec. 18, 2009

(65) Prior Publication Data

US 2010/0138104 A1 Jun. 3, 2010

Related U.S. Application Data

(63) Continuation of application No. 12/025,639, filed on Feb. 4, 2008, now Pat. No. 7,667,622, which is a continuation of application No. 10/982,288, filed on Nov. 4, 2004, now Pat. No. 7,327,286, which is a continuation of application No. 09/957,136, filed on Sep. 20, 2001, now Pat. No. 6,816,088, which is a continuation-in-part of application No. 09/736,904, filed on Dec. 13, 2000, now Pat. No. 6,687,583.

(60) Provisional application No. 60/170,782, filed on Dec. 15, 1999.

(51) Int. Cl.
*G08B 23/00* (2006.01)

(52) U.S. Cl. ...................... 340/984; 340/539.1; 340/618; 340/425.5

(58) Field of Classification Search .................. 340/984, 340/539.1, 311.2, 531, 603, 632, 438, 425.5, 340/459, 612, 618, 539.11
See application file for complete search history.

(56) References Cited

U.S. PATENT DOCUMENTS

| | | | |
|---|---|---|---|
| 3,801,972 A | 4/1974 | Kim et al. |
| 4,190,382 A | 2/1980 | Schmitz et al. |
| 4,341,178 A | 7/1982 | Price |
| 4,593,274 A | 6/1986 | Rizzo |
| 4,651,157 A | 3/1987 | Gray et al. |
| 4,825,457 A | 4/1989 | Lebowitz |
| 4,894,642 A | 1/1990 | Ashbaugh et al. |
| 5,142,473 A | 8/1992 | Davis |
| 5,214,616 A | 5/1993 | Terhune et al. |
| 5,367,297 A | 11/1994 | Yokoyama |
| 5,432,515 A | 7/1995 | O'Conner |
| 5,467,643 A | 11/1995 | Barnett et al. |
| 5,510,659 A | 4/1996 | Lewis et al. |
| 5,641,242 A | 6/1997 | Riviere |
| 5,729,452 A | 3/1998 | Smith et al. |

(Continued)

OTHER PUBLICATIONS

Newport Marine System published by newportsystems.com (website) printed Apr. 5, 2001.

(Continued)

*Primary Examiner* — Daniel Previl
(74) *Attorney, Agent, or Firm* — K&L Gates LLP

(57) ABSTRACT

The marine vessel monitoring system of the present invention enables marine vessel owners to monitor their vessels when they are unable or unavailable to personally do so. The system of the present invention provides an efficient method for inspecting and repairing a designated marine vessel at periodic intervals and for reporting the results of such inspections and repairs to the vessel's owner in a timely manner for the owner's review and consideration.

21 Claims, 5 Drawing Sheets

U.S. PATENT DOCUMENTS

| | | | |
|---|---|---|---|
| 5,828,969 A | | 10/1998 | Chamney et al. |
| 5,835,871 A | * | 11/1998 | Smith et al. ................... 701/29 |
| 5,844,473 A | | 12/1998 | Kaman |
| 5,852,984 A | | 12/1998 | Matsuyama et al. |
| 6,052,631 A | * | 4/2000 | Busch et al. ................... 701/29 |
| 6,150,928 A | | 11/2000 | Murray |
| 6,150,929 A | | 11/2000 | Wang |
| 6,220,194 B1 | | 4/2001 | Kjersem |
| 6,236,322 B1 | | 5/2001 | Lopatin et al. |
| 6,240,365 B1 | | 5/2001 | Bunn |
| 6,259,981 B1 | | 7/2001 | Wilcosky |
| 6,263,322 B1 | * | 7/2001 | Kirkevold et al. ............ 705/400 |
| 6,265,879 B1 | | 7/2001 | Landreth |
| 6,317,387 B1 | | 11/2001 | D'Amaddio et al. |
| 6,330,499 B1 | | 12/2001 | Chou et al. |
| 6,370,454 B1 | | 4/2002 | Moore |
| 6,370,455 B1 | | 4/2002 | Larson et al. |
| 6,397,131 B1 | | 5/2002 | Busch et al. |
| 6,415,207 B1 | | 7/2002 | Jones |
| 6,430,496 B1 | | 8/2002 | Smith et al. |
| 6,469,641 B1 | | 10/2002 | Lash et al. |
| 6,553,336 B1 | | 4/2003 | Johnson et al. |
| 6,556,904 B1 | | 4/2003 | Larson et al. |
| 6,597,973 B1 | | 7/2003 | Barich et al. |
| 6,633,820 B2 | | 10/2003 | Bizar |
| 6,822,462 B1 | | 11/2004 | Staerzl |
| 6,980,959 B1 | | 12/2005 | Garrow et al. |
| 2001/0033225 A1 | | 10/2001 | Razavi et al. |
| 2002/0082755 A1 | | 6/2002 | Tanaka |
| 2002/0118102 A1 | * | 8/2002 | Fundak et al. ............. 340/311.2 |
| 2002/0143445 A1 | | 10/2002 | Sinex |
| 2003/0158640 A1 | | 8/2003 | Pillar et al. |

OTHER PUBLICATIONS

Sure Action Incorporated published by sureaction.com (website) printed Apr. 5, 2001.
Flagship Marine Security published by boatalarm.com printed Apr. 5, 2001.
Motorboating/Boatkeeper published by Outboard Watchman Article May 2001.
Aerix.net published by aeris.net (website) printed Jul. 25, 2001.
Dock-Alert.com published by dock-alert.com printed Jul. 25, 2001.
3-Tek, Inc. published by www.3-tek.com (website) printed Jul. 27, 2001.
Motorola published by www.motorola.com Printed Jul. 27, 2001.
Office Action dated Feb. 13, 2008, U.S. Appl. No. 11/301,793, 7 pgs.
Office Action dated Oct. 16, 2008, U.S. Appl. No. 11/301,793, 7 pgs.
Office Action dated Apr. 14, 2009, U.S. Appl. No. 11/301,793, 9 pgs.
Office Action dated Mar. 17, 2010 for U.S. Appl. No. 11/301,793.
Final Office Action for U.S. Appl. No. 11/301,793 dated Aug. 10, 2010.

* cited by examiner

FIG. 3A

Inspection Report - Sample

Owner Information
Name: Jim Sullivan
Address: 3080 Ogden Avenue Suite 100
Minneapolis, MN 12345-9999
(419) 123-3948
jim_msullivan@msn.com Plan Type: Dockmaster Plan
via fax @ (419) 123-4596

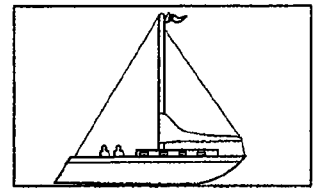

Dockmaster Contact
Name: Bill Watson
Phone: (630) 434-9902
Email: bwatson@yachtwatchman.com

Vessel Inspection
Vessel: The Shining Sentinel
Marina: Bay Harbor
Location: Lot 13-B
Inspected: September 14, 1999 @ 6:15 PM

- Exterior Lines
Dock Lines: ◯ Checked
Anchor/Mooring: ◯ More Details....
Dockside Connection: ◯ Checked

- Exterior Electric
Power Cords: ◯ Repair Now...
Dockside Breaker: ◯ Checked

- Exterior Entries
Windows: ◯ Repaired...
Doors: ◯ Checked
Hatches: ◯ Checked
Port Lites: ◯ Checked

- Exterior Coverings
Canvas: ◯ More Details...

FIG. 3B

Coverings: ○
Bridge Enclosures: ○ (N/A)
Bimini Tops:

- Gound Tackle

Davits: ○
Windlass: ○
Boat Hooks: ○
Cleats: ○

- Comments

Jim, If you order repairs by the end of the week, I'll go ahead and have the boat ready for your vacation next month. I'll keep you posted with weather conditions in the area shortly before you leave. Your next scheduled inspection will be next week. - Bill

US 8,022,844 B2

MARINE VESSEL MONITORING SYSTEM

PRIORITY CLAIM

This application is a continuation of U.S. patent application Ser. No. 12/025,639, filed Feb. 4, 2008 now U.S. Pat. No. 7,667,622 which is a continuation of and claims the benefit of U.S. patent application Ser. No. 10/982,288, filed Nov. 4, 2004, now U.S. Pat. No. 7,327,286 which is a continuation of and claims the benefit of U.S. patent application Ser. No. 09/957,136, filed Sep. 20, 2001, now U.S. Pat. No. 6,816,088 which is a continuation-in-part of and claims the benefit of U.S. patent application Ser. No. 09/736,904, filed Dec. 13, 2000, now U.S. Pat. No. 6,687,583 which is a non-provisional of and claims the benefit of U.S. Provisional Application No. 60/170,782, filed Dec. 15, 1999, the entire contents of which are incorporated herein.

DESCRIPTION

The present invention relates in general to a marine vessel monitoring system, and in particular to a marine vessel monitoring system which enables marine vessel owners to monitor their marine vessels when they are unable or not available to monitor their marine vessels.

BACKGROUND

Most boat or marine vessel owners leave their boat, yacht or vessel unattended and unmonitored for significant periods of time while docked or moored, or in dry storage. During these time periods, a number of things may happen (e.g., equipment/line failure, faulty through-hull fittings, intrusion, etc.) that may damage the boat or cause it to sink, or incur financial loss. Statistics show that for every one boat that sinks at sea, four boats sink at the dock or mooring. The costs to repair a boat that has been under water, even briefly, can be significant. In such situations, the owner of a boat must pay for the repairs not covered by insurance and is deprived of using, his or her boat until the boat is repaired.

Moreover, boat owners know these risks are present and are generally concerned about their unattended or unmonitored boats. Some boat owners have people check their boats. However, there is no coordinated system for checking boats, checking certain components of the boat and for regularly reporting the status of the boats to the boat owners. Accordingly, there is a need for an efficient and timely monitoring system that enables vessel owners to monitor their vessels when they are unable or unavailable to do so themselves.

SUMMARY

The marine vessel monitoring system of the present invention overcomes the above problems by providing a system for conducting thorough, interior and exterior periodic inspections and/or remotely monitoring designated boats, or vessels, for taking immediate corrective action, if necessary, to fix or repair any deficiencies noted during the inspection, and for immediately reporting or making available the results of inspections and monitoring reports and the corrective actions taken, if any, to the boat's owner so he or she stays informed on the current status of his or her boat. The information collected from these inspections and repairs is also preferably used to create historical databases for the boats monitored by the system.

In one embodiment of the present invention, sensors are placed on the vessel to monitor certain critical systems and conditions on the vessel. For example, sensors are provided for monitoring the operation of the bilge pump, monitoring smoke and fire detectors and monitoring battery voltage levels. The sensors are connected or hard-wired to a communication unit such as a telemetry unit. This communication unit is adapted to communicate with a central monitoring system at least in part over a wireless link.

The preferred embodiment includes a telemetry unit which generates and transmits a telemetry signal which contains coded data representing the state of the components or systems monitored by the various sensors deployed on the vessel. The monitoring system enables personnel remotely located from the vessel to receive this vessel data or telemetry data from the vessel and monitor or determine the vessel's condition. Thus, certain critical aspects of the vessel's condition may be continuously monitored without necessitating an actual physical inspection. If the telemetry data indicate a problem with one or more of the on board systems or conditions of the vessel, the remote monitoring system receives this information and enables personnel at the monitoring stations to contact the proper authority or designated organization or entity to address the problem identified in the telemetry data.

It is therefore an object of the present invention to provide a vessel monitoring system.

Another object of the present invention is to provide a vessel monitoring system that provides the vessel owner information on a vessel's condition.

A further object of the present invention is to provide a vessel monitoring system that immediately repairs or takes corrective action to fix any repairs identified during the detailed inspection and/or monitoring of the vessel.

Other objects, features and advantages of the present invention will be apparent from the following detailed disclosure, taken in conjunction with the accompanying sheets of drawings, wherein like numerals refer to like parts, components or steps.

Additional features and advantages are described herein, and will be apparent from, the following Detailed Description and the figures.

BRIEF DESCRIPTION OF THE FIGURES

FIGS. 3A and 3B are a sample inspection report of the vessel monitoring system of present invention.

DETAILED DESCRIPTION

Initiation Process

Figure 1:
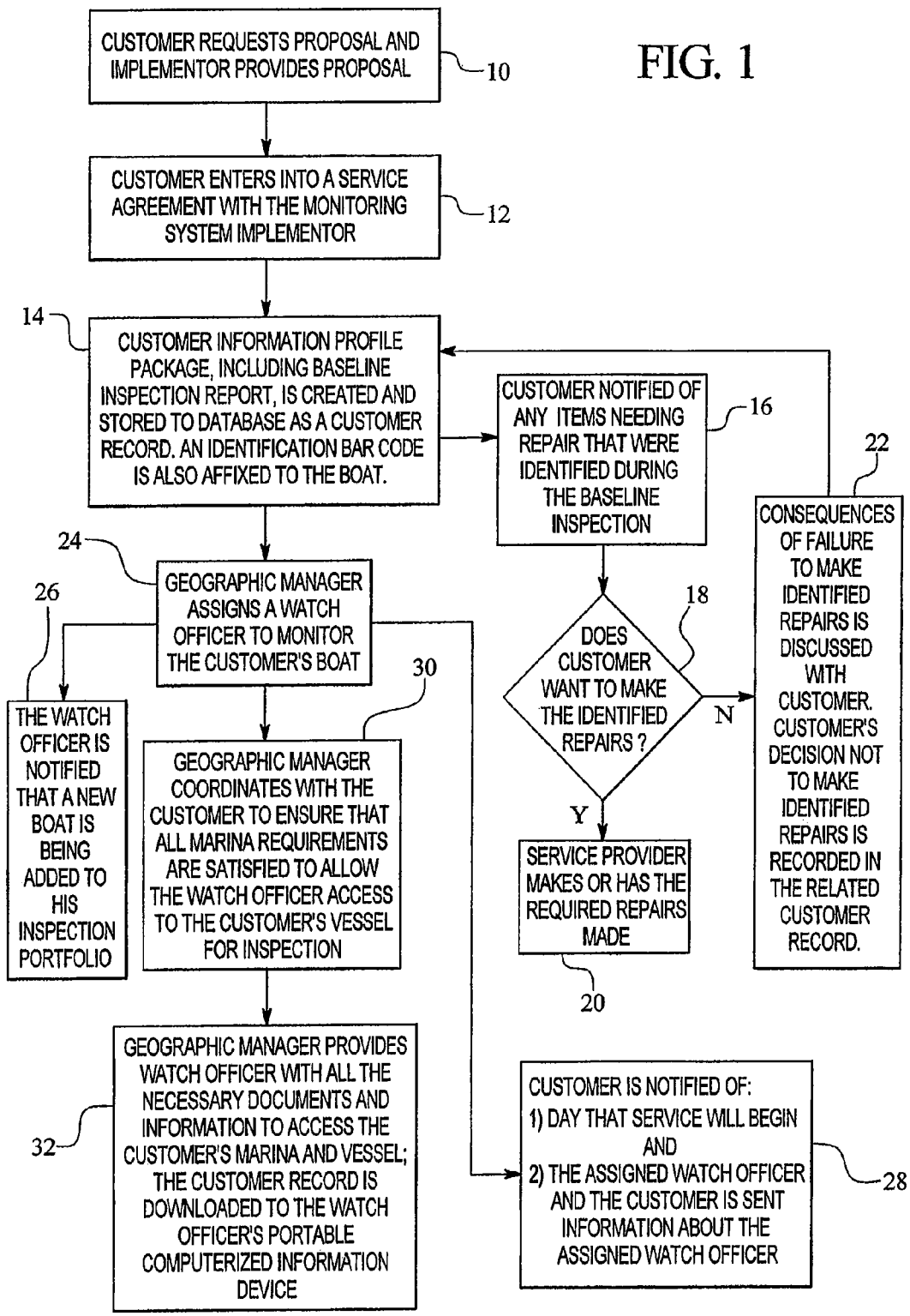
FIG. 1 is a schematic flowchart of the initiation process of the vessel monitoring system of the present invention.
Figure 2:
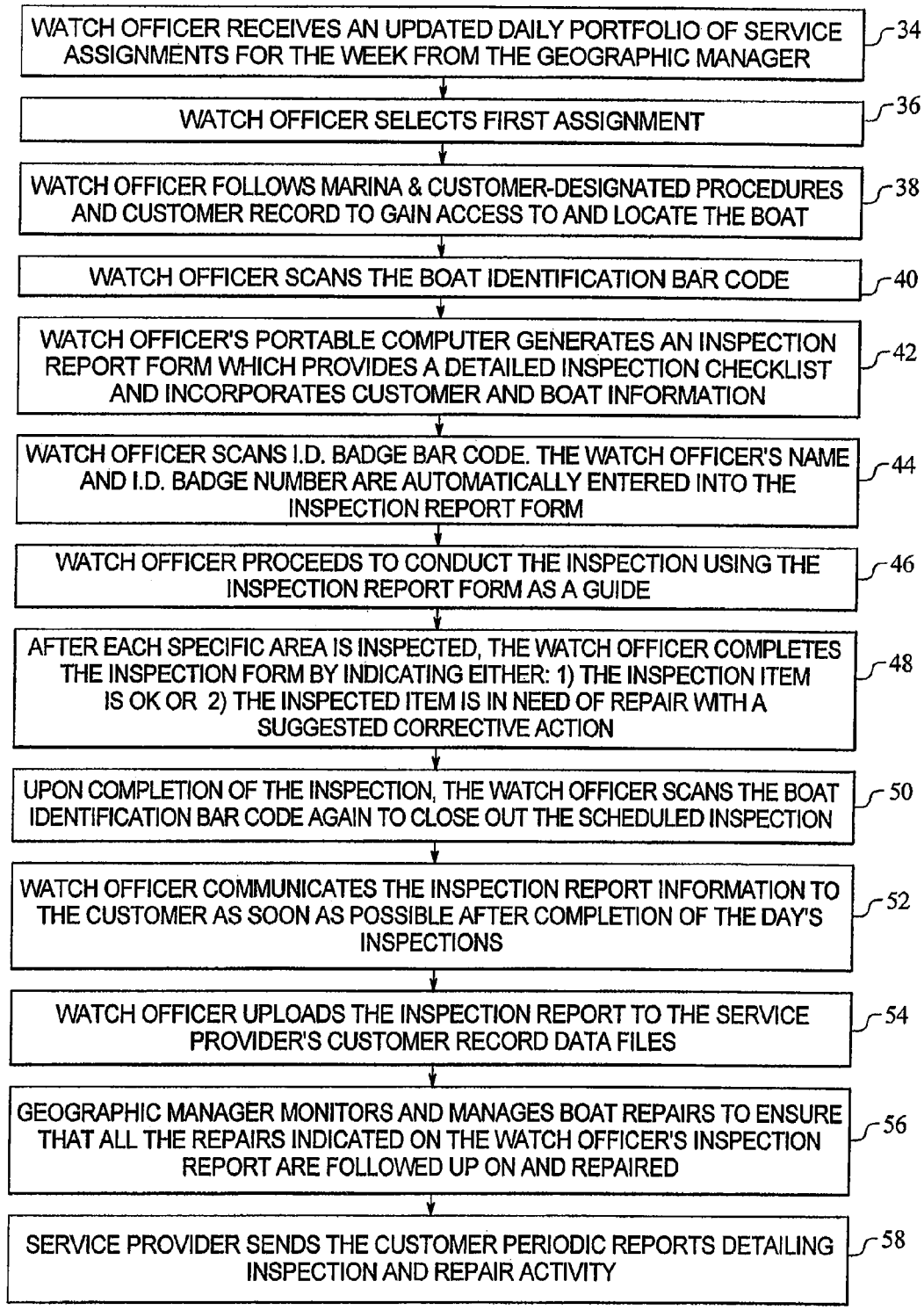
FIG. 2 is a schematic flowchart of the vessel monitoring process of the vessel monitoring system of present invention.

The vessel monitoring system of the present invention is preferably used by a plurality of vessel or boat owners, although it is described herein in relation to one boat or vessel owner. Referring now to the drawings, and particularly to FIG. 1, a vessel or boat owner, referred to herein as the boat owner, vessel owner or customer, establishes an account with an implementor of the vessel monitoring system of the present invention. As indicated by block 10, the customer, usually in response to some form of written or verbal solicitation or advertisement, initiates the process by requesting a monitoring proposal from the implementor. A geographic manager, preferably an employee of the implementor, prepares a monitoring proposal based on information supplied by the customer regarding the customer's vessel or, if deemed necessary, the geographic manager may visit and inspect the boat to prepare a more thorough monitoring proposal. This may be required for relatively large, unique or exceptionally complicated vessels. The implementor or geographic manager provides the monitoring proposal to the customer. The proposal, in addition to all the standard contractual terms required by the implementor, designates the type of monitoring for the designated boat. The monitoring may be customized as desired by the vessel owner or may be a standardized monitoring procedure.

The preferred embodiment of the vessel monitoring system of the present invention includes interior and exterior monitoring procedures, although it should be appreciated that the monitoring procedures could be varied. Generally, the exterior monitoring procedures includes an inspection of the exterior lines of the boat, the exterior electrical equipment, the exterior entries of the boat, the exterior boat coverings and the ground tackle. Generally, the interior monitoring procedures includes an inspection of the boat's interior, the engine room, the boat's bilge pumps, the boat's through-hull fittings and an inspection for oil and fuel leakage. The customer may select the exterior monitoring procedures, or the exterior and interior monitoring procedures.

If the customer accepts the proposal, the customer executes a service agreement with the implementor, as indicated in block 12. The geographic manager, as indicated in block 14, prepares a customer information profile for the boat, assigns a system identification number to the boat and in one embodiment prepares and affixes a bar code or other identifier device with the system identification number to the customer's boat, generally referred to as an identifier. The customer information profile includes details of the monitoring procedures contracted for, a photograph of the boat, the name and official hull identification number ("HIN"), a diagram of the boat and its equipment, a map of the customer's marina where the boat is docked or moored and any other information that the geographic manager considers pertinent for facilitating the monitoring procedures. In the embodiment where a bar code is affixed to the boat, the bar code is preferably a laser scannable type bar code, and is preferably affixed to the boat in a reasonably accessible location acceptable to the customer and where it is least effected by the elements. It should be appreciated that the system identification number for the boat does not need to be affixed to the boat.

The implementor also conducts a baseline inspection of the boat. The baseline inspection may be conducted by the geographic manager or may be outsourced to a boat inspection professional who conducts the inspection under the supervision of the implementor. The baseline inspection establishes a baseline for the condition of the equipment, features and overall condition of boat as a point of comparison for future inspections and monitoring. The information from the customer information profile created by the geographic manager and the information from the baseline inspection are inputted using a handheld communication device and stored in a conventional computer database or other conventional computer storage medium of the present invention which is maintained by the implementor. Preferably, the communication device is a computer connected to the computer database, although other devices are contemplated such as a handheld computer or personal digital assistant that communicate with the computer database through a secure internet connection or other data network. It is also contemplated that the implementor could input information using a telephone or cellular phone and voice recognition software. It should also be appreciated that while the present invention is discussed with respect to one implementor, one or more implementors (or watch officers, customers, etc.) may communicate simultaneously with the computer database using one or more communication devices.

Preferably, the conventional computer database is connected to or otherwise communicates with a processor or other controlling device, generally referred to as a controller, as is well known in the art. The stored information about the boat and customer is saved as a customer record on the database which contains all of the information pertinent to the customer and the customer's vessel.

If the implementor identifies any problems with the boat during the baseline inspection, the implementor notifies the customer, as indicated in block 16, and suggests possible repairs to the customer. If the customer wants to make the suggested repairs, upon the instruction of the customer, the implementor may itself or may, engage a third party to make the suggested repairs, as indicated by diamond 18 and block 20. If, on the other hand, the customer decides not to make the suggested repairs, the implementor informs the customer of the possible consequences of failing to repair the identified problems. If the customer thereafter does not wish to make the suggested repairs, the customer's decision is recorded in the customer record, as indicated by block 22.

After the initial customer record is created and stored in the database of the vessel monitoring system, the geographic manager assigns a watch officer to monitor the boat as indicated by block 24. The watch officer is preferably an employee of the implementor. The watch officer reports to the geographic manager and is responsible for performing the physical monitoring or inspections of the monitored boats at regular or designated intervals desired by the customer. It should be appreciated that these intervals could be weekly, biweekly, daily or any desired interval requested by the customer. The watch officer is also responsible for preparing the reports resulting from these inspections.

The geographic manager assigns a boat to a specific watch officer based on a number of factors. These include geographical location of the boat, travel time between boats in the watch officer's portfolio, the extent of the monitoring services (including the estimated inspection time), the complexity of the vessel, the watch officer's portfolio size, the watch officer's capabilities and any other factor that bears on properly assigning the monitored boats to the watch officer.

After the geographic manager assigns a specific boat to a specific watch officer, the geographic manager notifies the watch officer of this assignment (i.e., that this boat is added to his or her inspection portfolio), as indicated by block 26 and notifies the customer of this primary assignment. As indicated by block 28, the geographic manager also notifies the customer the day that monitoring of the customer's boat will begin. Along with this notification, the geographic manager provides the customer information about the assigned watch officer. This information includes the watch officer's name, his or her profile, his or her credentials, his or her picture, his or her contact information for enabling the customer to contact the watch officer and any other information deemed pertinent for the customer to know about the watch officer. The geographic manager also inquires as to the customer's preferred method of handling problems if they should arise. The geographic manager inputs and stores this preference in the customer record in the database for future reference and use. It should be appreciated and discussed below, that the geographic manager or implementor could provide this information to the customer via any suitable means, generally referred to as the customer information means, including without limitation, via telephone, facsimile, e-mail or the internet.

The geographic manager also reviews the customer's marina access policies with the customer and ensures that the implementor has all the necessary documentation, materials and authorization for the watch office to access the marina and the customer's boat, as indicated by block 30. This documentation usually includes a vessel insurance certificate indicating the customer's marina and a written consent form, signed by the customer, granting the watch officer access to the marina and the boat. This may also include keys or key cards for access to the marina and the boat. The geographic manager, as indicated in block 32, provides the watch officer with copies of the documentation and materials he or she needs to access the marina and the customer's boat. The watch officer also downloads for future reference the customer's record for the assigned boat from the implementor's database to a suitable input or communication device such as a portable computer or other suitable device (e.g., a personal digital assistant, laptop, phone or cellular phone), preferably via a suitable internet connection with the implementor's secure internet web site.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Monitoring Process

As block 34 indicates, the implementor or geographic manager preferably provides each watch officer with a daily portfolio of monitoring assignments for boats assigned to the watch officer. The geographic manager, preferably with the assistance of conventional scheduling program, takes a number of factors into account when making these daily assignments. The geographic manager factors in the location of the boat, distance between assignments, the watch officer's previously scheduled assignments and any other pertinent factors. Each watch officer preferably downloads his or her daily service assignment portfolio to his or her portable computer, preferably via a secure connection on the internet.

As block 34 indicates, the implementor or geographic manager preferably provides each watch officer with a daily portfolio of monitoring assignments for boats assigned to the watch officer. The geographic manager, preferably with the assistance of conventional scheduling program, takes a number of factors into account when making these daily assignments. The geographic manager factors in the location of the boat, distance between assignments, the watch officer's previously scheduled assignments and any other pertinent factors. Each watch officer preferably downloads his or her daily service assignment portfolio to his or her portable computer, preferably via a secure connection on the internet.

From the daily service assignment portfolio, the watch officer selects his first assignment for the day, as indicated in block 36. Upon arriving at the marina, the watch officer follows all the procedures indicated in the customer record on his portable computer to access the marina and the boat, as indicated by block 38. The geographic manager may accompany the watch officer if this is the watch officer's first inspection of the boat.

Once at the boat, as indicated in block 40, the watch officer uses his or her portable computer to scan the boat identification bar code affixed to the boat. The watch officer's portable computer generates an inspection report form, as indicated by block 42, that guides the watch officer through the required inspection. FIGS. 3A and 3B illustrate an example inspection report form. The generated inspection report form indicates the date and time of the commencement of the inspection. It also incorporates pertinent customer and boat information which is retrieved from the updated customer record stored on the watch officer's portable computer. Such pertinent information may include: (i) the boat owner's name, address and contact information; (ii) the name and type of boat being inspected; (iii) the type of service plan contracted for and marina and docking information. At the beginning of the inspection and at the end of the inspection, the watch officer also scans his identification badge bar code, as indicated by block 44. The portable computer captures the boat identification number and the watch officer's information, such as name and contact information, and incorporates this information into the inspection report form. This enables the implementor, geographic manager and customer, by later accessing this information, to determine the identification of the watch officer who monitored the boat, when the inspection ended and the results of the inspection. The system also enables the boat owner to respond to questions asked in the inspection report. For example, the boat owner may send a message to the implementor to repair or have repaired a broken item on the vessel.

As indicated by block 46, the watch officer proceeds to inspect the vessel, using the inspection report form as a guide. The areas to inspect listed on the inspection report form will vary depending on the type of monitoring procedure agreed upon by the customer and the implementor. The inspection may focus only on the exterior areas of the vessel or may also focus on the interior areas of the vessel.

The inspection of the exterior of the boat preferably includes:
  a. determining how is the vessel sitting in the water;
  b. determining if the vessel is pulling on the starboard side, or is it heavy on the port side (which could indicate that the boat could have water on one side or the other, or one fuel tank could be loaded more than the other);
  c. investigating anything noticeably wrong with the boat;
  d. checking that the exterior lines on both sides of the vessel to ensure they are in the proper perspective (including checking if the stern lines go through cleats on the boat and accounting for tidal waters);
  e. checking the dockside water connections, including the outside water lines coming into the vessel;
  f. checking fenders, including ensuring that all fenders are properly placed to protect the vessel from side damage and raising or lowering to the dock height to account for tidal waters;
  g. inspecting the exterior electrical lines (including making certain that the connection is made properly, that the breakers are set, that the line going into the vessel is equally secured, that the capped line is properly closed to prevent salt water from getting in and causing damage and checking to ensure the electrical lines are out of the water);
  h. checking exterior entries to the vessel to insure that all windows, doors, hatches, port lights, etc. are properly secured;
  i. inspecting canvas and bridge enclosures and glass and plastic window covering to ensure that everything is snapped down and in place, that no areas are exposed, checking the dinghy or a tender boat, ensuring that their coverings are properly enclosed and secured to mountings and checking the bridge enclosure to make sure all snaps, ties and zippers are properly taken care of; and j. checking ground tackle to ensure that the davits, the windlass, the anchor windlass, and the anchor, are properly secured with safety chain, and that all boat hooks, gaffs, and other ground tackle are not loose and wandering about the boat.

The inspection of the interior of the boat preferably includes:

a. checking interior electrical, including checking to ensure that all electrical switches are in the "OFF" position (except for those circuits the owner wants left on) and checking light switches to determine if they work;

b. checking the electrical panel board and other electrical components to ensure that if the vessel is on the proper voltage supply, and checking that the voltage and AMP Meters are registering properly;

c. checking the engine room, including checking out all hoses for fuel or oil leaks, checking the main engines to ensure there is no water seepage or transmission leaks, observing the filters to ensure that they are not dripping into the bilges, and that no oil spills are occurring, checking the generators to ensure that there are no fuel or oil leaks and that proper oil absorption pads are in place; and checking for any water leaks into the heat exchange cooling systems; and d. checking the bilges, including checking the bilges forward, midsection, as well as cockpit or lazarette bilges, checking all pumps' switches are "ON" in the control panel, and that they are on "Automatic" (if the boat owner desires), checking the bilge alarms by lifting the float plate, checking the stuffing, the wax inside the stuffing box, is properly lubricated and checking for oil or fuel leakage.

After inspecting an area required by the inspection report form, the watch officer enters his inspection results, as indicated by block 48. If no discrepancies or items in need of repair are detected, the watch officer enters a "satisfactory" or "checked" comment in his inspection report next to the description of the applicable inspection area. If discrepancies were found or items were found to be in need of repair, the watch officer enters a description of the discrepancy in his inspection report next to the description of the applicable inspection area. The watch officer also describes any corrective action he took to correct a problem (e.g. secure a broken line or missing line holding the boat) or suggests repairs he or she believes the boat owner should take to fix the problem (e.g., replace a faulty boat cover). The watch officer may provide a detailed explanation on the entire inspection and highlight any corrective action he or she took in the comments section at the bottom of the inspection report. When the watch officer completes his inspection, he clicks the enter button, or scans the bar code attached to the boat one more time, as indicated in block 50. The finishing date and time of the inspection are captured and may be incorporated into the inspection report.

The watch officer continues this inspection process for every boat assigned to him on his daily service assignment portfolio. At the end of each day, after all the assigned boats have been inspected, or alternatively after each inspection, the watch officer provides each customer whose boat he or she has inspected a copy of their inspection report, as indicated by block 52. This inspection report is preferably sent to the customer on the monitor's web site in a separate customer, member or owner report section. Although it may be sent in any other form (e.g., e-mail, fax or conventional mail) as well. The watch officer also uploads all of his or her inspection reports from the day to the implementor's database. The inspection reports are added to each customer's customer record, as indicated by block 54. Customers may then visit the implementor's secure web site after entering a pre-selected user name and password, to access their boat's inspection, repair and historical information. The geographic manager reviews all of the uploaded reports and flags items that are designated as requiring repair for follow up action, as indicated by block 56. The flagged items are saved to a follow up file which contains a master list of all repairs that need to be completed and a statement of the status of the repairs. The implementor prioritizes these repairs, and the repairs are made in the order of priority. Once a repair is finished, the status of the repair job is changed to "complete," and the repair job is removed from the pending repair job master list.

As indicated by block 58, the implementor provides periodic reports to the customer. At the end of each month, the implementor provides the customer a report detailing the recommended repairs and the action taken on the boat in the last month. At the end of the year, the implementor provides the customer a composite statement listing all the activity for that boat for the year.

Telemetry Unit

Figure 4:
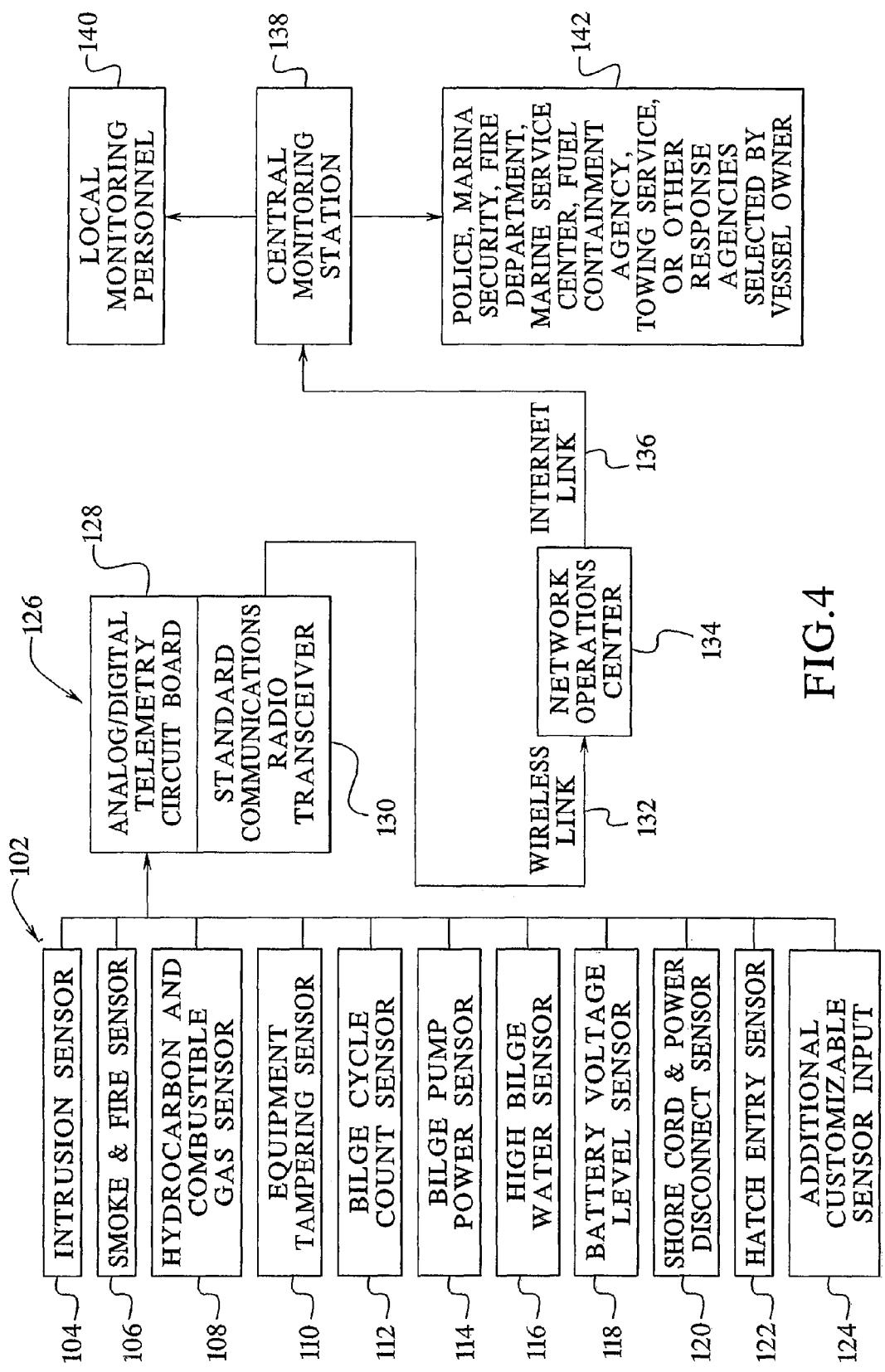
FIG. 4 is schematic flow chart of a system for remotely monitoring the condition of a vessel.

An alternative embodiment of the present invention is generally illustrated in the FIG. 4. In this embodiment, a plurality of sensors 102 are strategically placed throughout a vessel and hard wired or otherwise adapted to communicate with a telemetry unit 126 preferably mounted within the vessel. The telemetry unit 126 is configured to communicate data from the plurality of sensors 102 to a network operations center 136 over a wireless link 132. The network operations center 136 is adapted to communicate or forward this data received from the telemetry unit 126 to a central monitoring station 138 over a computer network connection such as an internet link 136. The central monitoring station 138 includes a display from which monitoring personnel may view the status of the vessel as detected by the sensors 102. The central monitoring station also includes provisions for displaying instructions for responding to an emergency, alarm or other condition detected on the vessel. These provisions may include instructions to contact local monitoring personnel 140 or a designated authority, service organization or entity such as the police or fire department 142.

The telemetry unit may be configured to receive any number of switch sensor inputs, inputs from battery voltage level sensors and inputs from other sensors, detectors and measurement devices, collectively referred to herein as sensors. In one embodiment of the present invention, the telemetry unit 126 is connected to and configured to receive signals from eight switch sensors. Such switch sensors 102 include: an intrusion sensor 104; a smoke and fire sensor 106; hydrocarbon and combustible gas sensors 108; an equipment tampering sensor 110; a bilge pump cycle counter 112; a bulge pump power sensor 114; a bilge high water sensor 112; a battery voltage level sensor 118; a shore cord and power sensor 120; and a hatch entry sensor 122. The vessel monitoring system of the present invention may additionally include customizable sensor inputs 124 for monitoring other systems and conditions on the vessel. These switch sensors 102 are representative of the types of functions that are monitored by the telemetry unit 126. Other sensors not shown in FIG. 4 may be employed and the sensors shown in FIG. 4 may be omitted depending on the type of vessel, and the vessel owner's requirements and preferences. The sensors will initiate an alarm whenever the condition monitored by the sensor activates the switch.

Various conditions may activate a switch for the different sensors. The following is a list of preferred sensors and their functions:

Sensor Definitions

Bilge High Water Sensor:
Commercially available float switch which makes contact when high water causes the switch to rise. This sensor is set above the expected highest water level in a vessel that is properly protected with a bilge pump, and connects only when the water reaches that level.

Bilge Pump Cycle Count Sensor:
This is a function of the unit itself and does not use any external sensors. Power from the normal bilge pump control float switch is also sent to the unit for processing.

Bilge Pump Constant Running or Pump Failure Sensor:
This also is a function of the Unit itself and does not use any external sensors. Power from the normal bilge pump control float switch is monitored and sent to the unit which detects constant voltage.

Intrusion Sensor:
Commercially available infrared motion sensor used in businesses and residential settings to detect motion within a defined area.

Door or Hatch Sensor:
Commercially available magnet actuated switches that either make or break an enclosed contact when the magnetic field is removed by opening the cabin door or hatch.

Smoke and Fire Sensor:
Commercially available marine rated 12 volt smoke detector with additional contacts that are hard wired to the main unit.

Battery Voltage Sensor:
This is a wired connection from one or more batteries which enables the unit to monitor battery voltage. One set of contacts also provides power to the unit (and to the other hard wired sensors if necessary). In the event the batter voltage falls to 11.5 volts with no load, an appropriate signal is sent to the monitoring station.

Equipment Tampering Sensor:
This may be one or more conventional switches or contacts that sense equipment removal attempts, and either make or break a contact that is wired to the unit on the monitored vessel.

Explosive Gasses Sensor:
This is one of several commercially available devices that monitor the atmosphere surrounding the sensor, and close a switch contact when a mixture that is approaching an explosive potential is detected.

Refrigerator or Freezer High Temperature Sensor:
This is a commercially available temperature sensitive switch that is preset to a high temperature level. When this temperature is reached a contact closes, sending this signal to the unit indicating that the refrigerator or freezer has reached an unacceptable temperature level.

Shore Cord Power Disconnect Sensor:
This is a commercially available transformer that is wired into the 110 volt AC circuit on the monitored vessel and sends a low voltage to the unit. When shore power to the vessel is lost, either by a power outage or by disconnecting the shore cord, a signal is sent to the monitoring station. If the monitoring system is enabled without shore power to the vessel, the system will ignore this portion of the monitored functions.

Additional Custom Sensors:
The telemetry system on a monitored vessel facilitates the addition of other analog or digital signals from a variety of sensors. These sensors may be added or removed in order to customize a particular vessel, depending upon the needs of any vessel owner.

In one embodiment of the present invention, the telemetry unit 126 is also connected to and also configured to receive signals from and monitor the charge on four of the vessel's main batteries. The telemetry unit is preferably adapted to report voltage measured at the batteries to the central monitoring station at regular intervals such as once every week, as part of a regular status report. Also, the telemetry unit is preferably adapted to report an alarm to the central monitoring station if the voltage, drops below a pre-defined threshold.

In one embodiment, the telemetry unit 126 is housed in a suitable shielded weather tight enclosure mounted inside the vessel. The sensors 102 are hard wired to the telemetry unit using marine grade wiring. All leads entering the telemetry unit are sealed to prevent moisture and other contaminates from entering the enclosure. The telemetry unit 126 is secured to the vessel by mounting bolts or other suitable fasteners accessed from within the telemetry unit housing to enhance mounting security and prevent external tampering. An antenna is connected to the telemetry unit and is provided on the exterior of the enclosure of the telemetry unit for broadcasting the telemetry signal. The telemetry unit 126 is powered directly from the vessel's main batteries.

One embodiment of the telemetry unit 126 includes an analog/digital telemetry circuit board 128 which receives the sensor inputs and generates the telemetry signal. The telemetry signal includes data indicating the status of the systems and components monitored by the sensors. The telemetry unit 126 also includes a radio transceiver 130 for transmitting the telemetry signal. In one embodiment of the telemetry unit, the radio transceiver is a cellular telephone control channel radio transceiver. In this embodiment, the cellular telephone control channel radio transceiver 130 transmits the telemetry signal by contacting a network operations center 134 over a wireless link 132. The telemetry unit 126 contacts the network operations center 134 using a unique identification code assigned by the network operations center. Once connected to the network operations center, the telemetry unit 126 transmits the telemetry signal containing data identifying the vessel and indicating the status of certain or all of the onboard sensors. The telemetry unit 126 may be configured to communicate with the network operations center 134 whenever any of the onboard sensors detects an abnormal condition on the vessel. The telemetry unit 126 is also configured to contact the network operations center on a periodic basis, such as once a week, to report the status of the various sensors 102. The periodic reports allow trends reflecting the slow deterioration of equipment to be detected prior to a complete system failure.

In one embodiment of the present invention, the telemetry unit 126 including the analog and digital telemetry circuit board 128 is produced by Crosstar LLC, of Arden Hills, Minn. A network operations center 134 is operated by a company that specialized in cellular phone control systems data transmissions.

As indicated above, each sensor 102 monitors a specific condition on the vessel. An alarm event occurs whenever the condition of interest to a particular sensor reaches an abnormal or undesirable state. When an alarm event is detected, the sensor outputs a signal indicating that the condition monitored by the sensor has reached an abnormal or undesirable state. When one or more sensors detects an alarm event the telemetry unit 126 contacts the network operations center and transmits the appropriate data. The data sent by the telemetry unit 126 identifies the vessel and identifies the sensor that has detected the alarm event. If the alarm event is detected by an analog sensor, such as a battery voltage sensor, a value associated with the sensor's output may also be sent by the telemetry unit 136.

When the network operations center 134 receives data from the telemetry unit 126 over the wireless link 132, whether as the result of an alarm event or a regularly scheduled status report, the network operations center 134 forwards the telemetry data to a central monitoring station 138, preferably over a secure internet link. Thus, the network operations center acts as a gateway between the wireless cellular network and the internet.

At the network operations center 134, the telemetry data are extracted from the wireless telemetry signal and converted to packet switched data for transmission to the central monitoring system. The network operations center directs the telemetry data to a network server at the central monitoring station 138. The central monitoring system is adapted to receive and process the data. If the data include an alarm condition, the monitoring system causes the name and location of the vessel on which the event occurred to be displayed on a computer monitor. The alarm event such as Bilge Pump Cycling Time, Battery Low Voltage, or the like, is also displayed. Thus, monitoring personnel located at the central monitoring station 138 are substantially immediately apprised of the occurrence of an alarm event on the vessel and may take immediate steps to rectify the situation.

The central monitoring station 138 includes a database which stores records for each vessel monitored by the system as described above. Each record includes data fields identifying a vessel; the vessel's owner; the location where the vessel is moored; the owner's contact information; and the like. The records also preferably include emergency contact information and contingency instructions for responding to the various alarm events that may be reported to the central monitoring station. For example, a database record for a particular vessel may include the instruction to call the local fire department in the event that a smoke sensor detects smoke in the cabin. The central monitoring system may be set up so that the instruction to call the fire department is displayed with the appropriate telephone number when the smoke detector alarm is received. Similarly, an instruction to call the harbor police or marina security along with the corresponding telephone number may be stored in the database record of the vessel, and the instruction and telephone number displayed when the main hatch sensor detects an unauthorized person entering the vessel. Other arrangements with marine service providers may also be set up to respond to detected equipment failures and the like. Contingency instructions may include details as to when various third party contacts are available, and names alternate contacts if a first contact is unavailable. The contingency instructions may also include instructions to contact the vessel owner in response to certain alarms. In this way monitoring personnel may be instructed to respond quickly and appropriately to emergency situations occurring on the vessel. As shown in FIG. 4, this response may involve contacting police, marina security, fire department, marine service center, fuel containment agency, towing service, or other response agency selected by the vessel owner, as indicated in block 142. The proper response may also involve contacting monitoring personnel stationed at or near the marina where the vessel is located, as indicated by block 140.

The central monitoring system 138 further includes an archival database for storing event logs and status reports for each vessel monitored by the system. As indicated above, vessel owners may then access the data stored in the archival database through an internet web page. After requesting and receiving login and password information from the vessel owner, the owner may access the archival database to view data specific to the vessel owned by the vessel owner identified during the login procedure. The web page, including the vessel specific data may then be downloaded to the vessel owner over the internet and displayed by the vessel owner's web browser. In this way a vessel owner may be kept informed of the status of his or her vessel as frequently as desired, and in particular may obtain specific information on the status of specific conditions of the vessel. This is extremely useful, for example, if the vessel owner believes that the vessel's batteries are being drained for another mechanical device is not working correctly.

While the present invention is described in connection with what is presently considered to be the most practical and preferred embodiments of the present invention, the invention is not limited to the disclosed embodiments. Modifications and variations in the present invention may be made without departing from the novel aspects of this invention.

The invention is claimed as follows:

1. A vehicle monitoring system for enabling a plurality of users to monitor a plurality of movable vehicles, said vehicle monitoring system comprising:
   an electronic memory device configured to store data for each vehicle, said data for each vehicle including:
      vehicle owner data,
      vehicle owner contact data,
      vehicle identifier data,
      vehicle owner login data,
      vehicle owner password data,
      historical vehicle location data,
      current vehicle location data,
      historical vehicle battery condition data,
      current vehicle battery condition data,
      historical vehicle entry data,
      current vehicle entry data,
      historical vehicle remote power connection data,
      current vehicle remote power connection data,
      historical vehicle engine related data,
      current vehicle engine related data,
      historical vehicle smoke or fire data,
      current vehicle smoke or fire data,
      historical vehicle interior compartment data,
      current vehicle interior compartment data,
      historical vehicle repair data, and
      current vehicle repair data;
   a processor configured to operate with the memory device, said processor configured to receive and operate with the memory device to store said
      vehicle owner data,
      vehicle owner contact data,
      vehicle identifier data,
      vehicle owner login data,
      vehicle owner password data,
      historical vehicle location data,
      current vehicle location data,
      historical vehicle battery condition data,
      current vehicle battery condition data,
      historical vehicle entry data,
      current vehicle entry data,
      historical vehicle remote power connection data,
      current vehicle remote power connection data, historical vehicle engine related data,
current vehicle engine related data,
historical vehicle smoke or fire data,
current vehicle smoke or fire data,
historical vehicle interior compartment data,
current vehicle interior compartment data,
historical vehicle repair data, and
current vehicle repair data;
a receiver configured to, for each vehicle, receive data regarding said vehicle through a data network from a data transmitter on the vehicle at regular fixed intervals, said data transmitter configured to:
transmit signals to the receiver at said regular fixed intervals, and
transmit alarm event data when a component monitored by a sensor on the vehicle enters an undesired state; and
a transmitter configured to, for each vehicle, send data stored in the memory device for said vehicle through the data network to an owner computer to enable the owner computer to display an electronic page for said vehicle which includes data stored in said memory device relating to historical and current conditions of said vehicle, said electronic page configured to display and enable a vehicle owner to view:
vehicle identifier information,
historical vehicle location information,
current vehicle location information,
historical vehicle battery condition information,
current vehicle battery condition information,
historical vehicle entry information,
current vehicle entry information,
historical vehicle remote power connection information,
current vehicle remote power connection information,
historical vehicle engine related information,
current vehicle engine related information,
historical vehicle smoke or fire information,
current vehicle smoke or fire information,
historical vehicle interior compartment information,
current vehicle interior compartment information,
historical vehicle repair information, and
current vehicle repair information.

2. The vehicle monitoring system of claim 1, wherein the vehicles are boats and the data includes, for each boat, historical bilge pump data and current bilge pump data.

3. The vehicle monitoring system of claim 1, wherein the data network is an internet.

4. The vehicle monitoring system of claim 1, wherein the electronic memory device is configured to, for each vehicle, store historical manual inspection data for said vehicle.

5. The vehicle monitoring system of claim 1, wherein, for each vehicle, the data transmitter on the vehicle is a cellular telemetry unit.

6. The vehicle monitoring system of claim 1, wherein said data for each vehicle includes:
historical vehicle remote water connection data, and
current vehicle remote water connection data;
said processor is configured to receive and operate with the memory device to store said
historical vehicle remote water connection data, and
current vehicle remote water connection data; and
said electronic page is configured to display:
historical vehicle remote water connection information, and
current vehicle remote water connection information.

7. The vehicle monitoring system of claim 1, wherein the electronic page is configured to display and enable the vehicle owner to view a diagram of said vehicle.

8. A vehicle monitoring system for enabling a plurality of users to monitor a plurality of movable vehicles, said vehicle monitoring system comprising:
an electronic memory device configured to store data for each vehicle, said data for each vehicle including:
vehicle owner data,
vehicle owner contact data,
vehicle identifier data,
vehicle owner login data,
vehicle owner password data,
current vehicle location data,
current vehicle battery condition data,
current vehicle entry data,
current vehicle remote power connection data,
current vehicle engine related data,
current vehicle smoke or fire data,
current vehicle interior compartment data, and
current vehicle repair data;
a processor configured to operate with the memory device, said processor configured to receive and operate with the memory device to store said
vehicle owner data,
vehicle owner contact data,
vehicle identifier data,
vehicle owner login data,
vehicle owner password data,
current vehicle location data,
current vehicle battery condition data,
current vehicle entry data,
current vehicle remote power connection data,
current vehicle engine related data,
current vehicle smoke or fire data,
current vehicle interior compartment data, and
current vehicle repair data;
a receiver configured to, for each vehicle, receive data regarding said vehicle through a data network from a data transmitter on the vehicle at regular fixed intervals, said data transmitter configured to:
transmit signals to the receiver at said regular fixed intervals, and
transmit alarm event data when a component monitored by a sensor on the vehicle enters an undesired state; and
a transmitter configured to, for each vehicle, send data stored in the memory device for said vehicle through the data network to an owner computer to enable the owner computer to display an electronic page for said vehicle which includes data stored in said memory device relating to current conditions of said vehicle, said electronic page configured to display and enable a vehicle owner to view:
vehicle identifier information,
current vehicle location information,
current vehicle battery condition information,
current vehicle entry information,
current vehicle remote power connection information,
current vehicle engine related information,
current vehicle smoke or fire information,
current vehicle interior compartment information, and
current vehicle repair information.

9. The vehicle monitoring system of claim 8, wherein the vehicles are boats and the data includes, for each boat, current bilge pump data.

10. The vehicle monitoring system of claim 8, wherein the data network is an internet.

11. The vehicle monitoring system of claim 8, wherein the electronic memory device is configured to, for each vehicle, store manual inspection data for said vehicle.

12. The vehicle monitoring system of claim 8, wherein, for each vehicle, the data transmitter on the vehicle is a cellular telemetry unit.

13. The vehicle monitoring system of claim 8, wherein said data for each vehicle includes current vehicle remote water connection data, said processor is configured to receive and operate with the memory device to store said current vehicle remote water connection data, and said electronic page is configured to display said current vehicle remote water connection information.

14. The vehicle monitoring system of claim 8, wherein the electronic page is configured to display and enable the vehicle owner to view a diagram of said vehicle.

15. A vehicle monitoring system for enabling a plurality of users to monitor a plurality of movable vehicles, said vehicle monitoring system comprising:
  an electronic memory device configured to store data for each vehicle, said data for each vehicle including:
    vehicle owner data,
    vehicle owner contact data,
    vehicle identifier data,
    vehicle owner login data,
    vehicle owner password data,
    historical vehicle location data,
    historical vehicle battery condition data,
    historical vehicle entry data,
    historical vehicle remote power connection data,
    historical vehicle engine related data,
    historical vehicle smoke or fire data,
    historical vehicle interior compartment data, and
    historical vehicle repair data;
  a processor configured to operate with the memory device, said processor configured to receive and operate with the memory device to store said
    vehicle owner data,
    vehicle owner contact data,
    vehicle identifier data,
    vehicle owner login data,
    vehicle owner password data,
    historical vehicle location data,
    historical vehicle battery condition data,
    historical vehicle entry data,
    historical vehicle remote power connection data,
    historical vehicle engine related data,
    historical vehicle smoke or fire data,
    historical vehicle interior compartment data, and
    historical vehicle repair data;
  a receiver configured to, for each vehicle, receive data regarding said vehicle through a data network from a data transmitter on the vehicle at regular fixed intervals, said data transmitter configured to:
    transmit signals to the receiver at said regular fixed intervals, and
    transmit alarm event data when a component monitored by a sensor on the vehicle enters an undesired state; and
  a transmitter configured to, for each vehicle, send data stored in the memory device for said vehicle through the data network to an owner computer to enable the owner computer to display an electronic page for said vehicle which includes data stored in said memory device relating to historical conditions of said vehicle, said electronic page configured to display and enable a vehicle owner to view:
    vehicle identifier information,
    historical vehicle location information,
    historical vehicle battery condition information,
    historical vehicle entry information,
    historical vehicle remote power connection information,
    historical vehicle engine related information,
    historical vehicle smoke or fire information,
    historical vehicle interior compartment information, and
    historical vehicle repair information.

16. The vehicle monitoring system of claim 15, wherein the vehicles are boats and the data includes, for each boat, historical bilge pump data.

17. The vehicle monitoring system of claim 15, wherein the data network is an internet.

18. The vehicle monitoring system of claim 15, wherein the electronic memory device is configured to, for each vehicle, store historical manual inspection data for said vehicle.

19. The vehicle monitoring system of claim 15, wherein, for each vehicle, the data transmitter on the vehicle is a cellular telemetry unit.

20. The vehicle monitoring system of claim 15, wherein said data for each vehicle includes historical vehicle remote water connection data, said processor is configured to receive and operate with the memory device to store historical vehicle remote water connection data, and said electronic page is configured to display historical vehicle remote water connection information.

21. The vehicle monitoring system of claim 15, wherein the electronic page is configured to display and enable the vehicle owner to view a diagram of said vehicle.

\* \* \* \* \*